Patented May 16, 1950

2,507,506

UNITED STATES PATENT OFFICE 2,507,506

METHOD AND INTERMEDIATES FOR PRODUCTION OF ALKENYL AROMATIC COMPOUNDS

Robert R. Dreisbach and Robert A. Martin, Midland, and Arthur J. Erbel, Bay City, Mich., assignors to The Dow Chemical Company, Midland, Mich., a corporation of Delaware No Drawing. Application August 23, 1946, Serial No. 692,736

23 Claims. (Cl. 260—462)

This invention concerns an improved method for the production of alkenyl aromatic compounds having from 2 to 3 carbon atoms in an alkenyl radical, particularly nuclear substituted styrenes, in a form of high purity. It also pertains to certain new compounds obtained as chemical intermediates in practice of the method.

It is well known that such alkenyl aromatic compounds may be formed by passing vapors of an alkylated aromatic compound, having from 2 to 3 carbon atoms in an alkyl radical, through a reaction zone heated at pyrolysis temperatures in the order of from 500° to 750° C. and thence to cooling units where the aromatic components of the mixture are condensed. This general method is applied in the manufacture of styrene from ethylbenzene and it has been employed experimentally in forming various other alkenyl aromatic compounds such as nuclear chlorinated styrenes, nuclear alkylated styrenes, vinyl naphthalene, and alpha-methyl styrene from corresponding alkylated benzene compounds. Although the method permits economical formation of the alkenyl aromatic compounds in crude form, subsequent purification of the products often is troublesome and expensive.

During such pyrolysis, only a portion of the alkylated aromatic starting material is dehydrogenated in a single pass through the reaction zone, with the result that the condensed products comprise a large proportion of unreacted starting material, together with the alkenyl aromatic product which is of close to the same boiling point as said starting material. Various by-products such as benzene, or toluene, etc., are usually also present. In the production of nuclear substituted styrenes such as chlorostyrene or ethylstyrene from ethyl-chlorobenzene or diethylbenzene, respectively, the alkylated aromatic starting material is usually a mixture of isomeric compounds differing slightly in boiling points and the resultant nuclear substituted styrenes are also mixtures of isomers which differ slightly from one another in boiling points. Often the difference between the distilling temperatures of one or more isomers of the alkylated aromatic starting materials and one or more isomers of the alkenyl aromatic product amounts to only a few degrees centigrade and is no greater than the difference between the distilling temperatures of isomers of the starting material or isomers of the alkenyl aromatic product. Because of this relationship, separation of the alkenyl aromatic product from the unreacted starting material by distillation requires efficient fractionation and would be difficult, even if the materials subjected to distillation were sufficiently stable to withstand the prolonged period of heating involved.

However, the alkenyl aromatic products tend to undergo polymerization at usual distilling temperatures. In the instance of the manufacture of styrene from ethylbenzene, the above-mentioned complications due to presence of isomeric compounds do not arise and the styrene may be stabilized sufficiently by addition of a polymerization inhibitor to withstand a fractional distillation operation without undergoing appreciable polymerization. However, nuclear substituted styrenes, such as para-chlorostyrene, dichlorostyrene, or ethyl-vinylbenzene, etc., generally distill at temperatures higher than styrene, often comprise isomers, and in many instances undergo polymerization more readily and rapidly at a given temperature than does styrene. Stabilization against polymerization of a pyrolysis mixture comprising a nuclear substituted styrene and fractional distillation to purify the styrene derivative and recover an unreacted alkylated aromatic starting material in condition for recycling to the pyrolysis reaction is far more difficult than in the instance of a pyrolysis mixture containing styrene as the alkenyl aromatic product and frequently is impractical. However, partial concentration of such alkenyl aromatic compound by distillation, e. g. to obtain fractions containing from 70 to 90 per cent of the compound, is feasible.

It is an object of this invention to provide an improved method for the production of alkenyl aromatic compounds, particularly nuclear substituted styrenes, in a form substantially free of other aromatic compounds. A particular object is to provide such method for the production of a purified mixture of isomeric nuclear substituted styrenes. A further object is to provide certain new boric acid esters which are obtainable as intermediates during practice of the method. Other objects will be apparent from the following description of the invention.

The method of this invention comprises steps of forming an alpha-halo-alkyl aromatic compound corresponding to the alkenyl aromatic compound which is to be produced, hydrolyzing the alpha-halo-alkyl aromatic compound to form a corresponding alcohol, esterifying the alcohol by reaction with boric acid, distilling water and aromatic components other than the ester from the latter, hydrolyzing the ester to regenerate the alcohol, and dehydrating the alcohol to obtain a corresponding alkenyl aromatic compound. The alkenyl aromatic compound, thus produced, is of high concentration, but usually comprises a minor amount, e. g. up to 10 per cent, of the alcohol from which it is formed. The invention comprises a step of further purifying the product by adding boric acid in amount sufficient to esterify the alcohol impurity and distilling the alkenyl aromatic compound from the mixture.

The process, as just outlined, may be amplified by an initial step of removing associated organic compounds from the halo-alkyl aromatic compound by distillation prior to hydrolyzing the latter. However, such initial distillation is not, of itself, sufficient to permit production of a pure alkenyl aromatic compound in good yield unless the subsequent combination of steps just mentioned, particularly the steps of forming a boric acid ester of the alcohol formed by the hydrolysis and of distilling impurities from the ester, are also employed. The reason why such esterification and removal of impurities from the ester are required is that hydrolysis of the distilled halo-alkyl aromatic compound usually ceases, or becomes extremely sluggish, when only from 70 to 85 per cent of the material is hydrolyzed and that the unreacted halo-alkyl aromatic compound tends to distill together with the alcohol product so that the latter cannot satisfactorily be purified by distillation. Also, the hydrolysis mixture usually contains a minor amount of the alkyl aromatic compound not halogenated in the side chain and its presence also interferes with direct purificiation of the alcohol by distillation. It is believed that the alkyl aromatic compound not halogenated in the side chain is formed in minor amount as a by-product in the hydrolysis, but it may be an impurity which accompanies the alpha-halo-alkyl aromatic compound during distillation of the latter.

Since the impurities which normally accompany the side chain halogenated alkyl aromatic compound may readily be distilled from the boric acid ester of the alcohol formed by hydrolysis of said compound, it is not necessary that the side chain halogenated compound initially be purified by distillation. The principal advantage of such initial distillation is that of reducing the volume of materials to be handled in the hydrolysis and esterification steps of the process.

It should be mentioned that the boric acid esters of alpha-hydroxy-alkyl aromatic compounds, which are formed as intermediate products in the process, are new chemical compounds. They are high boiling liquid triesters of boric acid which are readily hydrolyzed by water to regenerate the alcohol in excellent yield. Their principal use, at present, is as chemical agents from which corresponding pure alkenyl aromatic compounds may be produced readily and in excellent yield. However, they possess insecticidal properties and can be used as components of insecticidal compositions.

The impure alpha-halo-alkyl aromatic compound used as a starting material in the process may be obtained in either of two known ways. It may be produced by monohalogenating, e. g., chlorinating or brominating, a corresponding alkylated aromatic compound in the side chain. Usually, such halogenation is stopped short of completion so as to avoid excessive formation of by-products polyhalogenated in the side chain. As a result, the halogenated material contains the alpha-halo-alkyl aromatic compound in admixture with the alkylated aromatic compound subjected to the halogenation. Procedures for halogenating alkylated aromatic compounds in the side chain are well known and need not be described in detail. However, it may be mentioned that the halogenation is advantageously carried out in the presence of a phosphorus halide, e. g. $PCl_3$, $PBr_3$, $PCl_5$ or $PBr_5$, as a catalyst.

An alpha-halo-alkyl aromatic compound may also be obtained by treating an impure alkenyl aromatic compound, obtained by the pyrolytic dehydrogenation of an alkylated aromatic compound with a hydrogen halide, e. g. HCl or HBr, and stirring the mixture to cause chemical combination of the hydrogen halide and alkenyl aromatic compound. Prior to such hydrohalogenation reaction, the crude pyrolysis mixture is preferably distilled to separate the alkenyl aromatic compound in a concentration of 70 per cent by weight or higher, since hydrogen halide does not react readily with a less concentrated alkenyl aromatic compound to form an alpha-halo-alkyl aromatic compound in high yield. Since hydrogen halides are catalysts for polymerization of the alkenyl aromatic compounds, a polymerization inhibitor such as catechol, or tertiary butyl catechol, etc., may advantageously be added prior to carrying out the hydrohalogenation reaction, but such inhibitor is not in all instances required.

In practice of the invention, a mixture of an alpha-halo-alkyl aromatic compound and the corresponding alkylated aromatic compound, or a mixture of isomers of such compounds, e. g. as obtained from either of the sources just mentioned, is advantageously subjected to fractional distillation for purpose of removing the major portion of the alkylated aromatic compound not halogenated in the side chain and thereby reducing the quantity of material to be handled in subsequent steps of the process. However, this distillation, which is preferably carried out under vacuum, does not of itself assure production of a pure alkenyl aromatic product and may be omitted. Any alkylated aromatic compounds, unchlorinated in the side chain, are removed in a subsequent step of the process.

The alpha-halo-aromatic compound, or an aromatic mixture comprising the same, is hydrolyzed with water to form the corresponding alpha-hydroxy-aliphatic compound. The hydrolysis is usually accomplished by heating and stirring the alpha-halo-alkyl aromatic compound together with from 1 to 3 times its weight of water at temperatures in the order of from 60° to 100° C. for from 1 to 2 hours, but it may be carried out more rapidly at higher temperatures and superatmospheric pressure and the water may be used in proportions smaller or greater than those just stated. After carrying out the hylrolysis, the aqueous and organic layers of the mixture are separated. The organic layer comprises an alcohol formed by the hydrolysis, usually also a minor amount of an unhydrolyzed side chain halogenated alkyl aromatic compound which tends to distill together with the alcohol, and frequently also organic compounds, e. g. alkylated aromatic compounds, which were present together with the alpha-halo-akyl aromatic compound subjected to the hydrolysis.

Due to the presence of the unhydrolyzed side chain halogenated material, the alcohol cannot readily be rendered satisfactorily pure by distilling the impurities directly therefrom without occurrence of excessive loss of the alcohol by vaporization together with the impurities. Such loss of the alcohol is curtailed, or avoided, by esterifying the alcohol with boric acid during, or prior to, the distillation. The esterification is accomplished by treating the alcoholic material with sufficient boric acid so that upon reaction with the alcohol, a corresponding triester of boric acid is formed. Usually, about one molecular equivalent of boric acid is used for every three moles of the alpha-halo-alkyl aromatic compound hydrolyzed to form the alcohol, but the boric acid may be used in smaller or larger proportions if desired. In place of boric acid, boric oxide together with sufficient water to hydrate the same, may be used. In some instances, the organic layer of the aforementioned hydrolysis mixture retains sufficient water to permit direct use of boric oxide as the esterifying agent.

The mixture of the alcoholic material and boric acid is heated under vacuum to a temperature sufficient to distill therefrom water formed in the esterification reaction and also organic impurities, e. g. the alkylated aromatic compounds and unhydrolyzed halo-alkyl aromatic compounds, usually present in the crude alcoholic product. During heating the mixture is maintained under vacuum, e. g. at an absolute pressure of less than 100 millimeters. When the mixture is heated at 10 millimeters absolute pressure, the distillation usually occurs for the most part at temperatures ranging from 100° to 130° C. Very little, if any, of the alcohol is vaporized together with the steam.

As a residue from the distillation, a triester of boric acid is obtained in a form substantially free of organic impurities. The ester is hydrolyzed by adding water, preferably in amount sufficient to dissolve the boric acid formed by the hydrolysis. Usually from 1 to 3 parts by weight of water are added per part of the ester, but the water may be used in smaller or larger proportions. Hydrolysis of the ester occurs gradually at room temperature and rapidly at temperatures in the order of from 50° to 100° C. In practice, the hydrolysis is accomplished by heating the mixture at temperatures of from 60° to 80° C. for 5 or 10 minutes.

The aqueous and alcoholic layers of the hydrolyzed mixture are separated and the alcohol is dehydrated to obtain the alkenyl aromatic product. Dehydration of the alcohol may be accomplished in any known manner, e. g. by heating the same together with an alkali acid sulphate, or other dehydration catalyst, to a temperature at which the alkenyl aromatic product distills as it is formed.

Dehydration of the alcohol is preferably accomplished in an intermittent manner using an alkali acid sulphate, preferably ammonium acid sulphate, as a dehydration catalyst. The alkali acid sulphate is heated under vacuum, e. g. at 200 millimeters absolute pressure or less, to a temperature of from 175° to 250° C. or thereabout. While continuing such heating under vacuum, the alcohol intermediate product is introduced, e. g. in amount corresponding to from 40 to 100 times the weight of the catalyst. The alcohol may be added quite rapidly. The resultant mixture, which usually is at a temperature of from 150° to 170° C., is heated gradually to a temperature of from 175° to 220° C. and the pressure on the mixture is reduced sufficiently to cause formation and vaporization of a mixture of water and an alkenyl aromatic product. Usually, such distillation is accomplished at less than 100 millimeters, and preferably less than 30 millimeters, absolute pressure. Heating under vacuum is continued until the distillation is complete. A further amount of alcohol may then be added and the operations be repeated to produce an added quantity of the alkenyl aromatic compound.

Instead of dehydrating the alcohol in the intermittent manner just disclosed, the alcohol may be dehydrated in continuous manner by feeding it below the surface of the molten catalyst and distilling water and the alkenyl aromatic compound from the mixture under vacuum as they are formed. However, the alkenyl aromatic compound is obtained in higher yield and in a form more nearly free of the alcohol when the intermittent dehydration procedure is employed.

The aqueous and organic layers of the distillate from the dehydration reaction are separated. The organic layer consists of the alkenyl aromatic product in a form of good purity, but usually containing 10 per cent by weight or less of the alcohol intermediate product. It may be freed of the alcohol by adding sufficient boric acid to esterify the same and distilling the alkenyl aromatic compound directly from the resultant mixture. The distillation may be carried out rapidly and without fractionation and may be accomplished before an appreciable amount of the alkenyl aromatic compound has undergone polymerization. A minor amount of a polymerization inhibitor, e. g. from 0.005 to 0.1 per cent of 2,4-dichloro-6-nitrophenol, is initially added and the distillation is carried out under vacuum while gradually feeding a further amount of the inhibitor into an upper section of the distilling column.

The method as just described permits economical production of alkenyl aromatic compounds in good yield and in a form substantially free of other organic compounds.

The following examples describe certain ways in which the principle of the invention has been applied, but are not to be construed as limiting its scope.

*Example 1*

Gaseous chlorine was passed into a solution of 16 grams of phosphorus pentachloride and 800 grams of a mixture of the ortho- and para-isomers of ethyl-chlorobenzene, while stirring and heating the mixture at 120° C. and permitting escape of hydrogen chloride as it was formed. The chlorine was introduced over a period of 3 hours and 10 minutes. At the close of the chlorination period, the reaction mixture weighed 906 grams. From the gain in weight during chlorination, it is evident that approximately 0.45 molecular equivalent of chlorine was reacted per mole of the ethyl-chlorobenzene starting material. A 792 gram portion of the resultant mixture was fractionally distilled with collection of 333 grams of a fraction which distilled for the most part at temperatures of from 81° to 91° C. at 5 millimeters absolute pressure and which consisted almost entirely of the isomeric alpha-chloroethyl-chlorobenzenes. The latter was admixed with five times its weight of water and the mixture was stirred and boiled under reflux for 2 hours. It was then permitted to settle into layers and the layers were separated. An aliquot portion of the aqueous layer was analyzed to determine its content of hydrochloric acid. From the analysis, it was calculated that 84.8 per cent of the alpha-chloroethyl-chlorobenzene had been hydrolyzed to form alpha-hydroxyethyl-chlorobenzene. The organic layer of the hydrolysis mixture comprised this alcohol product together with unreacted chloroethyl-chlorobenzene.

Several batches of crude alpha-hydroxyethylchlorobenzene, prepared as just described, were admixed to form a mixture containing about 80 per cent by weight of alpha-hydroxyethyl-chlorobenzene together with chloroethyl-chlorobenzene and a minor amount of other organic impurities such as ethyl-chlorobenzene. To 1371 grams of this mixture, 142 grams of boric acid was added. The resultant mixture was heated under vacuum to distill therefrom the organic impurities accompanying the alpha-hydroxyethyl-chlorobenzene and also water formed due to esterification of the latter by the boric acid. All material distilling at temperatures up to 110° C. at 10 millimeters absolute pressure was thus removed. As the residue from the distillation, there was obtained 1117 grams of the tri-alpha-[chlorophenylethyl] ester of boric acid. This ester is a new compound which is described, together with other similar esters, in Example 5. The ester was hydrolyzed by heating the same with about twice its weight of water at about 70° C. for 30 minutes and the aqueous and organic layers of the hydrolysis mixture were separated. The organic layer weighed 1108 grams and consisted almost entirely of alpha-hydroxyethyl-chlorobenzene. A 100 gram portion of ammonium acid sulphate was heated under vacuum to about 200° C. and the 1108 grams of alpha-hydroxyethyl-chlorobenzene was added in dropwise manner while maintaining the mixture at temperatures of from 195° to 210° C. at 40 millimeters absolute pressure and distilling water and chlorostyrene from the mixture as they were formed. The distillate settled into layers which were separated. The aqueous layer weighed 121 grams. As the organic layer there was obtained 898 grams of an oil consisting substantially of 793 grams of chlorostyrene and 105 grams of alpha-hydroxyethyl-chlorobenzene. The yield of chlorostyrene in the dehydration step just described was 89 per cent of theoretical, based on the alpha-hydroxyethyl-chlorobenzene consumed. The organic layer was treated with 0.5 per cent by weight of 2,4-dichloro-6-nitrophenol and fractionally distilled under vacuum, whereby 764 grams of chlorostyrene of greater than 99.5 per cent purity was obtained. The overall yield of the pure chlorostyrene from the alpha-chloroethyl-chlorobenzene starting material by the series of operations just described was approximately 60 per cent of theoretical, based on materials consumed.

Example 2

A mixture of the ortho- and para-isomers of ethyl-chlorobenzene was reacted with approximately 0.3 of its molecular equivalent of chlorine in the presence of phosphorus pentachloride as a catalyst under chlorination conditions similar to those described in Example 1. However, the chlorinated mixture was not distilled. Instead, 1600 grams thereof was admixed with 8 kilograms of water and the mixture was stirred and boiled under reflux for 2 hours. The aqueous and organic layers of the resultant mixture were separated and the aqueous layer was analyzed to determine its content of hydrochloric acid. From the analysis, it was calculated that practically all of the alpha-chloroethyl-chlorobenzene in the crude chlorinated mixture had been hydrolyzed to form alpha-hydroxyethyl-chlorobenzene. The organic layer of the hydrolysis mixture weighed 1500 grams and comprised the alpha-hydroxyethyl-chlorobenzene product. It was treated with 65 grams of boric acid and heated under vacuum to remove all material distilling at temperatures up to 109° C. at 12 millimeters absolute pressure. The distillate comprised ethyl-chlorobenzene, a minor amount of chlorostyrene, and water formed by the esterification reaction which preceded, or occurred during, the distillation. As the residue from the distillation, there was obtained 408 grams of tri-alpha-[chlorophenylethyl] borate. The ester was hydrolyzed by heating the same with water, as in Example 1, and the aqueous and organic layers of the hydrolysis mixture were separated. As the organic layer, there was obtained 334 grams of alpha-hydroxyethyl-chlorobenzene. A 305.5 gram portion of the latter was dehydrated by heating the same under vacuum in the presence of ammonium acid sulphate, as in Example 1, water and chlorostyrene being distilled from the mixture as formed. The distillate comprised 195.5 grams of chlorostyrene and 56 grams of unreacted alpha-hydroxyethyl-chlorobenzene. A 245 gram portion of the organic layer of the distillate was treated with 1.3 grams of 2,4-dichloro-6-nitrophenol and fractionally distilled under vacuum. There was obtained 237 grams of chlorostyrene as a fraction distilling at 188° to 189° C. at 8 to 9 millimeters absolute pressure. It was of approximately 99 per cent purity and consisted of a mixture of ortho- and para-chlorostyrenes. The overall yield of the purified chlorostyrene by the foregoing series of operations was 64.3 per cent of theoretical, based on materials consumed.

Example 3

Twenty grams of boric acid and 5 grams of 2,4-dichloro-6-nitrophenol were added to 533 grams of a crude mixture of alpha-hydroxyethyl-chlorobenzene and chlorostyrene containing about 271.3 grams of the latter. The chlorostyrene consisted of a mixture of the ortho- and para-isomers. Chlorostyrene was distilled from the mixture under vacuum. There was obtained 275 grams of chlorostyrene of 98.5 per cent purity, i. e. practically all of the chlorostyrene in the starting material was recovered in purified form. Tri-alpha-(chlorophenylethyl) borate was obtained as a residue from the distillation.

Example 4

A fraction of a mixture obtained by the pyrolysis of monoethylated xylene, which fraction contained approximately 86 per cent by weight of isomeric nuclear-dimethylated styrenes (hereinafter termed "dimethylstyrene") was admixed with an equal weight of an aqueous hydrochloric acid solution of 38 per cent concentration. The mixture was saturated with hydrogen chloride by introducing gaseous hydrogen chloride with stirring over a period of 42.5 hours while maintaining the mixture at approximately room temperature. The mixture was then permitted to settle into layers and the layers were separated. The organic layer was found to contain 8.9 per cent by weight of dimethylstyrene, i. e. the major part of the dimethylstyrene had reacted with the hydrogen chloride to form alpha-chloroethylxylene. The organic layer was fractionally distilled under vacuum to concentrate the chloroethylxylene in a fraction which distilled at 98°–102° C. at 8 millimeters absolute pressure. A 535 gram portion of the alpha-chloroethylxylene fraction was admixed with 2675 grams of water and the mixture was heated under reflux and with stirring at temperatures of from 90° to 100° C. for 3.5 hours. The mixture was then permitted to settle and the aqueous and organic layers were separated.

The aqueous layer contained hydrochloric acid in amount indicating that 90.5 per cent of the alpha-chloroethylxylene had been hydrolyzed. The organic layer, when dried, weighed 383 grams. It contained alpha-hydroxyethylxylene together with a large proportion of other organic compounds. The oil layer was heated to distill the alpha-hydroxyethylxylene and leave a residue of higher boiling materials. A 300 gram portion of distillate prepared by procedure similar to that just described, but boiling at from 191° to 243° C. at atmospheric pressure and containing about 50 per cent by weight of alpha-hydroxyethylxylene, was treated with 21 grams of boric acid. The mixture was gradually heated to 120° C. at 12 millimeters absolute pressure whereby the boric acid was esterified by reaction with the alpha-hydroxyethylxylene and water and organic impurities were distilled from the ester. As the distillate there were obtained 6 grams of water and 152 grams of organic materials. There was obtained 136 grams of a residue rich in tri-[alpha-(dimethylphenylethyl)] borate. The latter was hydrolyzed by heating the same with water, as in Example 1, and the aqueous and organic layers of the hydrolysis mixture were separated. As the organic layer there was obtained approximately 133 grams of alpha-hydroxyethylxylene. Several batches of purified alpha-hydroxyethylxylene, prepared as just described, were combined. One hundred fifty grams of ammonium acid sulphate was heated under vacuum to about 200° C. and 225 grams of the purified alpha-hydroxyethylxylene was added in dropwise manner while maintaining the mixture at temperatures of from 200° to 210° C. at 40 millimeters absolute pressure and distilling water and dimethylstyrene from the mixture as they were formed. As the distillate there were obtained 10 grams of water and 147 grams of dimethylstyrene of approximately 99.5 per cent purity. The residue from the distillation comprised approximately 48 grams of unreacted alpha-hydroxyethylxylene. The overall yield of purified dimethylstyrene was about 62.4 per cent of theoretical based on materials consumed in the above-described steps.

*Example 5*

Boric acid triesters of a mixture of isomeric alpha-hydroxyethylxylenes, of a mixture of the ortho- and para-isomers of alpha-hydroxyethyl-chlorobenzene, of substantially pure ortho-(alpha-hydroxyethyl) chlorobenzene, and of substantially pure para - (alpha - hydroxyethyl) chlorobenzene were prepared as in the preceding examples. In all instances, the esters were colorless liquids of boiling points higher than 250° C. at 10 millimeters absolute pressure. They undergo decomposition when attempt is made to distill them at said pressure. On being cooled, the esters did not form distinct crystals, but instead solidified to glass-like bodies. Because of this fact, definite freezing points were not determined. The density, $D_4^{25}$, and the index of refraction, $n_D^{25}$, of the respective esters are as follows:

| Boric Acid Triester of— | $D_4^{25}$ | $n_D^{25}$ |
| --- | --- | --- |
| Isomeric mixture of alpha-hydroxyethylxylenes | 1.0127 | 1.5286 |
| Mixture of o- and p-(alpha-hydroxyethyl)chlorobenzenes | 1.2062 | 1.5463 |
| o-(alpha-hydroxyethyl) chlorobenzene | 1.2058 | 1.5455 |
| p-(alpha-hydroxyethyl) chlorobenzene) | 1.2048 | 1.5457 |

As shown in the preceding examples, the esters are useful as agents from which corresponding alkenyl aromatic compounds may be produced in high yield and in substantially pure form. The esters were tested and found to be effective as insecticides for flies.

Procedures similar to those illustrated in Examples 1–4 have been applied in producing substantially pure dichlorostyrene from alpha-chloroethyl-dichlorobenzene; substantially pure vinyl-toluene from alpha-chloroethyl-toluene; and substantially pure bromostyrene from alpha-bromoethyl-bromobenzene. During preparation of these products, boric acid triesters of alpha-hydroxyethyl-dichlorobenzene, alpha-hydroxyethyl-toluene and alpha-hydroxyethyl-bromobenzene, respectively, were obtained as intermediate products. In similar manner, the invention may be applied in producing ethyl-vinylbenzene from alpha - chloro-diethylbenzene; vinyl - chlorotoluene from alpha-chloroethyl-chlorotoluene; alpha-methyl-chlorostyrene from alpha-chloroisopropyl - chlorobenzene; alpha - methyl - bromostyrene from alpha-bromoisopropyl-bromobenzene; ethyl-dichlorostyrene from alpha-chlorodiethyldichlorobenzene; or vinyl-naphthalene from alpha-chloroethyl-naphthalene, etc. When applying the method in producing these products, boric acid triesters of alpha-hydroxy-diethylbenzene, alpha-hydroxyethyl-chlorotoluene, alpha-hydroxyisopropyl-chlorobenzene, alpha-hydroxyisopropyl - bromobenzene, alpha - hydroxy - diethyldichlorobenzene, and alpha-hydroxyethyl-naphthalene, respectively, are formed as intermediate products. Other instances in which the invention may be applied in producing boric acid triesters of alpha-hydroxyalkyl aromatic compounds as intermediate products and corresponding alkenyl aromatic compounds as ultimate products will be apparent.

Other modes of applying the principle of the invention may be employed instead of those explained, change being made as regards the method or compounds herein disclosed, provided the steps or compounds stated by any of the following claims or the equivalent of such stated steps or compounds be employed.

We therefore particularly point out and distinctly claim as our invention:

1. A method which comprises hydrolyzing a halogenated aromatic hydrocarbon having, attached to a carbon atom of the aromatic nucleus, an alpha-halo-alkyl radical which contains from 2 to 3 carbon atoms, to remove the alpha-halogen atom and form a corresponding alcohol, heating the crude alcohol thus obtained together with at least its chemical equivalent of boric acid under vacuum to distill from the mixture non-alcoholic impurities associated with the alcohol and also water formed in the esterification reaction which takes place, hydrolyzing the residual ester to regenerate the alcohol, dehydrating the alcohol to form a corresponding alkenyl aromatic compound in admixture with a minor amount of said alcohol, treating the crude product thus obtained with boric acid in amount corresponding approximately to the chemical equivalent of the alcohol therein, and distilling the alkenyl aromatic product from the resultant mixture.

2. A method which comprises heating an impure halogenated aromatic hydrocarbon of the benzene series having, attached to a carbon atom of the aromatic nucleus, an alpha-halo-alkyl radical which contains from 2 to 3 carbon atoms, together with water to form a corresponding alpha-hydroxyalkyl aromatic compound in a form containing non-alcoholic aromatic impurities together therewith, treating the impure alpha-hydroxyalkyl aromatic compound with approximately its chemical equivalent of boric acid, heating the mixture at subatmospheric pressure to distill therefrom the non-alcoholic impurities and water formed in the esterification reaction which occurs, hydrolyzing the residual ester product by heating the same together with water so as to regenerate the alpha-hydroxyalkyl aromatic compound, and heating the latter together with ammonium acid sulphate at subatmospheric pressure to a temperature at which an alkenyl aromatic compound is formed and distilled from the mixture.

3. A method, as described in claim 2, wherein the alpha-halo-alkyl aromatic compound is nuclear halogenated.

4. A method, as described in claim 2, wherein the alpha-halo-alkyl aromatic compound is an alpha-chloroethyl-chlorobenzene.

5. A method, as described in claim 2, wherein the alpha-halo-alkyl aromatic compound contains at least one alkyl radical attached to the benzene nucleus thereof.

6. A method, as described in claim 2, wherein the alpha-halo-alkyl aromatic compound is an alpha-chloroethylxylene.

7. A method which comprises reacting boric acid with an alpha-hydroxyalkyl aromatic compound of the benzene series, containing from 2 to 3 carbon atoms in the hydroxyalkyl radical, which alpha-hydroxyalkyl aromatic compound is prepared by the hydrolysis of a corresponding halogenated aromatic hydrocarbon having, attached to a carbon atom of the aromatic nucleus, an alpha-halo-alkyl radical containing from 2 to 3 carbon atoms, to form a boric acid triester of the alpha-hydroxyalkyl aromatic compound.

8. A method, as described in claim 7, wherein the alpha-hydroxyalkyl aromatic compound is nuclear chlorinated.

9. A method, as described in claim 7, wherein the alpha-hydroxyalkyl aromatic compound of the benzene series is alpha-hydroxyethyl-chlorobenzene.

10. A method, as described in claim 7, wherein the alpha-hydroxyalkyl aromatic compound is nuclear alkylated.

11. A method, as described in claim 7, wherein the alpha-hydroxyalkyl aromatic compound of the benzene series is alpha-hydroxyethylxylene.

12. A method which comprises heating a mixture of an alpha-hydroxyalkyl aromatic compound of the benzene series, having from 2 to 3 carbon atoms in the hydroxyalkyl radical and prepared by the hydrolysis of a corresponding halogenated aromatic hydrocarbon, which alpha-hydroxyalkyl aromatic compound contains non-alcoholic aromatic impurities incident to formation of the same, and at least its chemical equivalent of boric acid at subatmospheric pressure, to distill from the mixture the non-alcoholic aromatic impurities and water formed by the esterification reaction which occurs, and thereby obtain a boric acid triester of the alpha-hydroxyalkyl aromatic compound as a residual product.

13. A method, as described in claim 12, wherein the alpha-hydroxyalkyl aromatic compound is nuclear halogenated.

14. A method, as described in claim 12, wherein the alpha-hydroxyalkyl aromatic compound is a nuclear chlorinated alpha-hydroxyethylbenzene.

15. A method, as described in claim 12, wherein the alpha-hydroxyalkyl aromatic compound is an alpha-hydroxyalkylchlorobenzene.

16. A method, as described in claim 12, wherein the alpha-hydroxyalkyl aromatic compound is nuclear alkylated.

17. A method, as described in claim 12, wherein the alpha-hydroxyalkyl aromatic compound of the benzene series is alpha-hydroxyethylxylene.

18. A compound having the general formula:

$$\left[ \underset{X\ Y}{\underset{|\ |}{\bigcirc}} - \underset{CH_3}{\underset{|}{C}} - O - \right]_3 B$$

wherein R represents a member of the group consisting of hydrogen and the methyl radical, and X and Y each represents a member of the group consisting of hydrogen, chlorine, bromine and alkyl radicals and at least one of the symbols X and Y represents a substituent other than hydrogen.

19. A boric acid triester of an alpha-hydroxyethyl-chlorobenzene, which triester has the general formula:

$$\left[ \underset{Cl}{\underset{|}{\bigcirc}} - \underset{CH_3}{\underset{|}{\overset{H}{C}}} - O - \right]_3 B$$

20. A boric acid triester of an alpha-hydroxyethylxylene, which triester has the general formula:

$$\left[ \underset{CH_3}{\overset{CH_3}{\bigcirc}} - \underset{CH_3}{\underset{|}{\overset{H}{C}}} - O - \right]_3 B$$

21. A method which comprises reacting boric acid with an alpha-hydroxyalkyl aromatic compound having the general formula:

$$\underset{X\ Y}{\underset{|\ |}{\bigcirc}} - \underset{CH_3}{\underset{|}{\overset{R}{C}}} - OH$$

wherein R represents a member of the group consisting of hydrogen and the methyl radical and X and Y each represents a member of the group consisting of hydrogen, chlorine, bromine and alkyl radicals and at least one of the symbols X and Y represents a substituent other than hydrogen, to form a boric acid triester of the alpha-hydroxyalkyl aromatic compound.

22. A method, as described in claim 21, wherein the alpha-hydroxyalkyl aromatic compound is alpha-hydroxyethyl-chlorobenzene.

23. A method, as described in claim 21, wherein the alpha-hydroxyalkyl aromatic compound is alpha-hydroxyethylxylene.

ROBERT R. DREISBACH.
ROBERT A. MARTIN.
ARTHUR J. ERBEL.

REFERENCES CITED

The following references are of record in the file of this patent:

UNITED STATES PATENTS

| Number | Name | Date |
|---|---|---|
| 2,068,415 | Klipstein | Jan. 19, 1937 |
| 2,305,236 | Bruson | Dec. 15, 1942 |

OTHER REFERENCES

"Chemical Abstracts," 28, 5810–11 (1934), abstracting article by Zalkind, et al., in "Plasticheskie Massui," 1934, No. 1, 14–20.